(12) United States Patent
Moser et al.

(10) Patent No.: US 7,823,130 B2
(45) Date of Patent: Oct. 26, 2010

(54) TESTING MACHINE-READABLE INSTRUCTIONS

(75) Inventors: Martin Moser, Speyer (DE); Markus Kohler, Kalserslautern (DE)

(73) Assignee: SAP AG, Walldorf (DE)

( * ) Notice: Subject to any disclaimer, the term of this patent is extended or adjusted under 35 U.S.C. 154(b) by 1032 days.

(21) Appl. No.: 11/534,610

(22) Filed: Sep. 22, 2006

(65) Prior Publication Data

US 2008/0126765 A1 May 29, 2008

(51) Int. Cl.
*G06F 9/44* (2006.01)

(52) U.S. Cl. ............... 717/124; 717/125; 717/126; 717/136; 717/139

(58) Field of Classification Search .......... 717/124
See application file for complete search history.

(56) References Cited

U.S. PATENT DOCUMENTS

| | | | | |
|---|---|---|---|---|
| 6,067,639 | A * | 5/2000 | Rodrigues et al. | 714/38 |
| 6,301,701 | B1 * | 10/2001 | Walker et al. | 717/125 |
| 7,457,989 | B2 * | 11/2008 | Ulrich et al. | 714/38 |
| 7,475,387 | B2 * | 1/2009 | Chandane | 717/128 |
| 7,568,183 | B1 * | 7/2009 | Hardy et al. | 717/121 |
| 2003/0208744 | A1 * | 11/2003 | Amir et al. | 717/124 |
| 2004/0088602 | A1 * | 5/2004 | Cohen et al. | 714/38 |
| 2005/0283761 | A1 * | 12/2005 | Haas | 717/124 |
| 2006/0070035 | A1 * | 3/2006 | Ulrich et al. | 717/124 |
| 2007/0240118 | A1 * | 10/2007 | Keren | 717/124 |

OTHER PUBLICATIONS

Liang S, Bracha G., "Dynamic class loading in the Java Virtual Machine." Proceedings of the 13th Conference on ObjectOriented Programming, Systems, Languages, and Applications. ACM Press, 1998; pp. 36-44.

* cited by examiner

*Primary Examiner*—Thomas K Pham
(74) *Attorney, Agent, or Firm*—Mintz, Levin, Cohn, Ferris, Glovsky and Popeo, P.C.

(57) ABSTRACT

Systems and techniques for testing machine-readable instructions. In one aspect, a method includes identifying a subroutine in a set of machine-readable instructions that can request a service from a service provider, modifying the identified subroutine to convey a description of a service request to a recorder, and storing the modified subroutine so that the modified subroutine is accessed during subsequent data processing activities and the description of the service request is conveyed to the recorder in response to a request for the service from the service provider during the data processing activities.

19 Claims, 14 Drawing Sheets

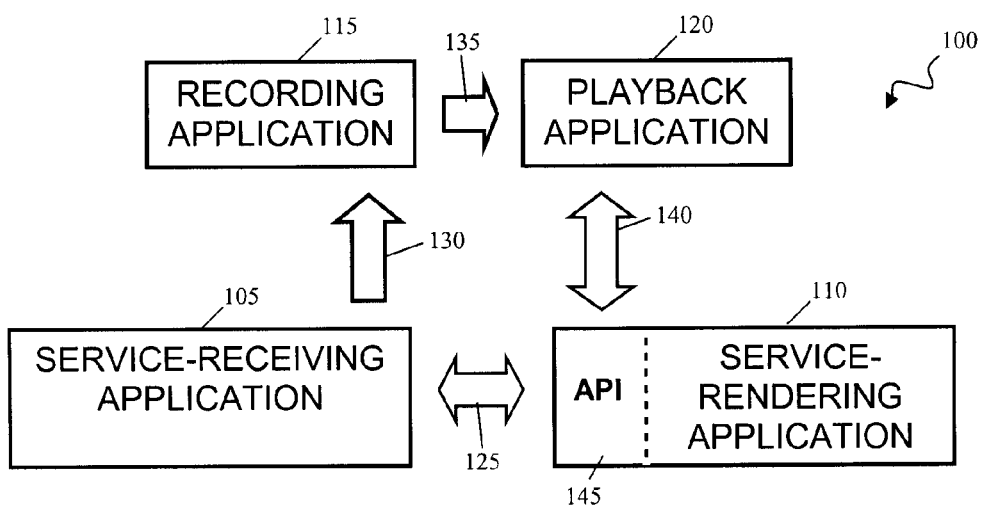
FIG. 1
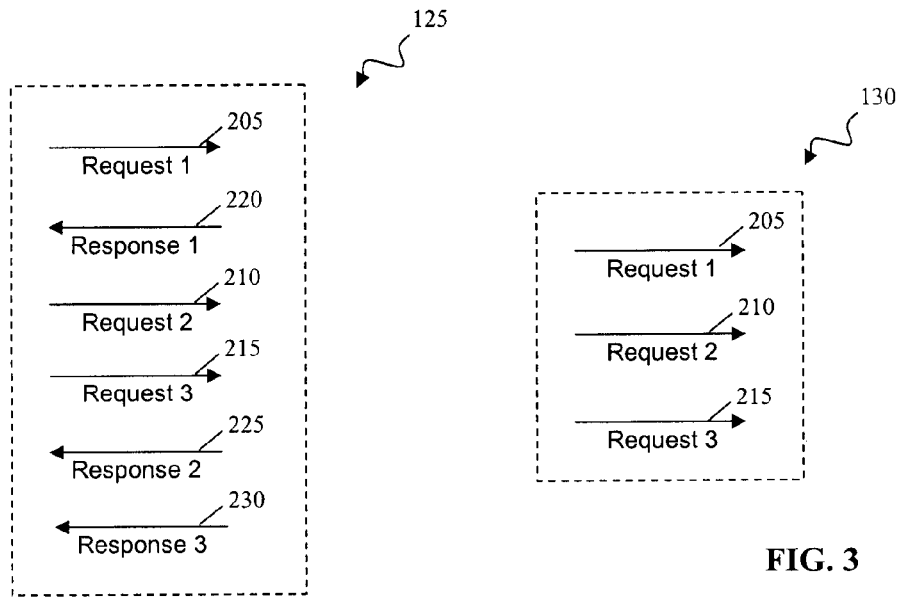
FIG. 2
FIG. 3

```
Persistency Methods 220
                                            /315
1305 ─▶ public Handle store(Object object)
                throws OStoreException;
                                                        /320
1310 ─▶ public Handle store(Object object, String[] ruleSets)
                throws OStoreException;
                                   /328
1325 ─▶ public Object retrieve(Handle handle)
                throws OStoreException;
1330 ─▶ public void remove(Handle handle)
                throws OStoreException;
1335 ─▶ public void remove(Object object)
                throws OStoreException;
1340 ─▶ public Object[] retrieveType(String className)
                throws OStoreException;
1345 ─▶ public Object[] retrieveType(String className, HashMap filter)
                throws OStoreException;
1350 ─▶ public Object[] retrieveType(String className, RetrievalFilter
                filter)
                throws OStoreException;
```

FIG. 13

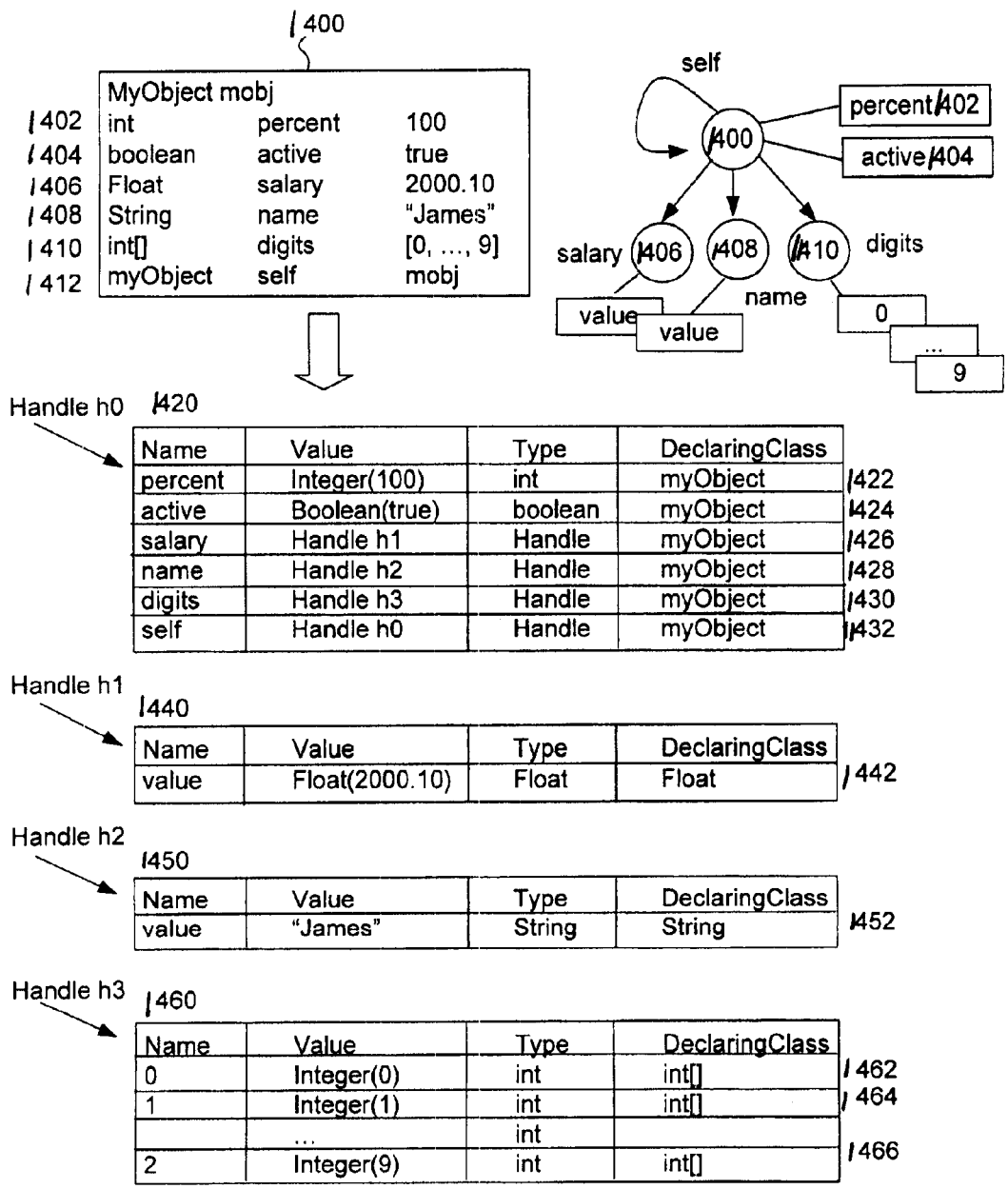
Fig./4

```
private Object newInstance(Class cls) {

Object object = null;

Constructor ctor = <default constructor of class cls>;          // 1528
    Object[] initargs = new Object[];

Constructor ctor = <specific constructor selected for class cls>;   // 1530
    Object[] initargs = <taken from OStore's configuration>;

Constructor ctor = <first constructor found for class cls>;     // 1532
    Object[] initargs = <default values for constructor parameters>;

object = ctor.newInstance(initargs);                            // 1534 return null;                                                    // 1536
    return object;                                                  // 1538
```

FIG. 15

Persistency Methods 620

1710 → `public Handle createHandle(Class cls)`
`    throws PersistenceManagerException;`

1720 → `public void insert(Handle handle, Member[] members)`
`    throws PersistenceManagerException;`

1730 → `public void update(Handle handle, Member[] members)`
`    throws PersistenceManagerException;`

1740 → `public void delete(Handle handle)`
`    throws PersistenceManagerException;`

1750 → `public Member[] select(Handle handle)`
`    throws PersistenceManagerException;`

1760 → `public Handle[] selectHandles(String className, HashMap filter)`
`    throws PersistenceManagerException;`

FIG. 17

Configuration File 800

```
<rules>
    <rule type="exclude" class="java.util.Date" field="simpleFormatter"/>
    <rule type="exclude" class="java.util.Date" field="gmtFormatter"/>
    <rule type="donotrecurseelements" class="java.util.Vector"
    <ruleset name= "RS1">
        <rule type="exclude" class="myApplication.Rates" field="ratesValues"/>
        <rule type="exclude" class="myApplication.Link" field="icon"/>
        <rule type="donotrecurse" class=" myApplication.Node" field="parent"/>
    </ruleset>
</rules>
```

TESTING MACHINE-READABLE INSTRUCTIONS

BACKGROUND

This disclosure relates to systems and techniques for testing machine-readable instructions.

Machine-readable instructions can be tested to determine if data processing activities performed in accordance with the instructions conform with expectations. One way of testing instructions is by requesting services from the instructions over an application program interface provided by the instructions.

SUMMARY

Systems and techniques for testing machine-readable instructions are described. In one aspect, a method includes identifying a subroutine in a set of machine-readable instructions that can request a service from a service provider, modifying the identified subroutine to convey a description of a service request to a recorder, and storing the modified subroutine so that the modified subroutine is accessed during subsequent data processing activities and the description of the service request is conveyed to the recorder in response to a request for the service from the service provider during the data processing activities.

This and other aspects can include one or more of the following features. The identified subroutine can be a collection of class files that participate in addressing a concern of the set of machine-readable instructions. The identified subroutine can be modified by instrumenting a collection of class files to convey the description of the service request to an external recording application and/or to send the request for the service to both the service provider and the recorder.

In another aspect, an article includes one or more machine-readable media that store instructions operable to cause one or more machines to perform operations. The operations include modifying machine-readable instructions to record descriptions of requests for services, performing workday operations in accordance with the modified machine-readable instructions and recording the descriptions of service requests made during those workday operations, and playing back the described service requests to the one or more service providing applications to test the one or more service providing applications. The services are requested from one or more service providing applications.

This and other aspects can include one or more of the following features. The operations can include assembling the recorded descriptions of service requests into an assembly of service requests. The assembly of service requests can be played back. The machine-readable instructions can be modified to convey copies of the requests for services to the recorder. A subset of the subroutines in the machine-readable instructions can be identified and modified. The machine-readable instructions can be modified by instrumenting a collection of class files to convey the description of the service request to an external recording application. The services provided by the one or more service providing applications can be compared to expectations to test the one or more service providing applications.

In another aspect, an article includes one or more machine-readable media storing instructions operable to cause one or more machines to perform operations. The operations includes instrumenting a collection of class files so that, in response to method calls being made to an application program interface by an application that requests services over the application program interface, identifications of the method calls and parameters with which the methods were called are to be described to a recorder, performing data processing activities with the application so that identifications and parameters in accordance with the performance are described to the recorder for recording, and playing back the method calls with the recorded identifications and parameters to the application program interface to test the application program interface.

This and other aspects can include one or more of the following features. The collection of class files can be instrumented by weaving calls to external coding into the class files in the collection. A user selection of class files to be instrumented can be received. For example, a collection of different functionalities of the data processing activities of an application can be identified to the user, a user selection of one or more functionalities in the collection can be received, and class files to be instrumented can be identified on the basis of participation in the one or more functionalities. The collection of class files can be instrumented based on participation in addressing a concern of the application that requests services. The data processing activities can be workday data processing activities. The actual results of playing back the method calls can be compared with expected results of playing back the method calls.

The details of one or more implementations are set forth in the accompanying drawings and the description below. Other features and advantages will be apparent from the description and drawings, and from the claims.

DESCRIPTION OF DRAWINGS

FIG. 1 is a schematic representation of an application landscape.

FIG. 2 is a schematic representation of data that is exchanged between a service-receiving application and a service-rendering application.

FIG. 3 is a schematic representation of service request descriptions that can be conveyed to a recording application from a service-receiving application.

FIG. 13 illustrates a number of persistency methods used by the object store API.

FIG. 14 illustrates the process of generating an intermediate data structure.

FIG. 15 illustrates a simplified coding example for locating an appropriate constructor for instantiating a class, according to an embodiment of the invention.

FIG. 17 illustrates the persistency methods of the persistence manager API.

FIG. 18 illustrates a configuration file.

Like reference symbols in the various drawings indicate like elements.

DETAILED DESCRIPTION

Figure 4:
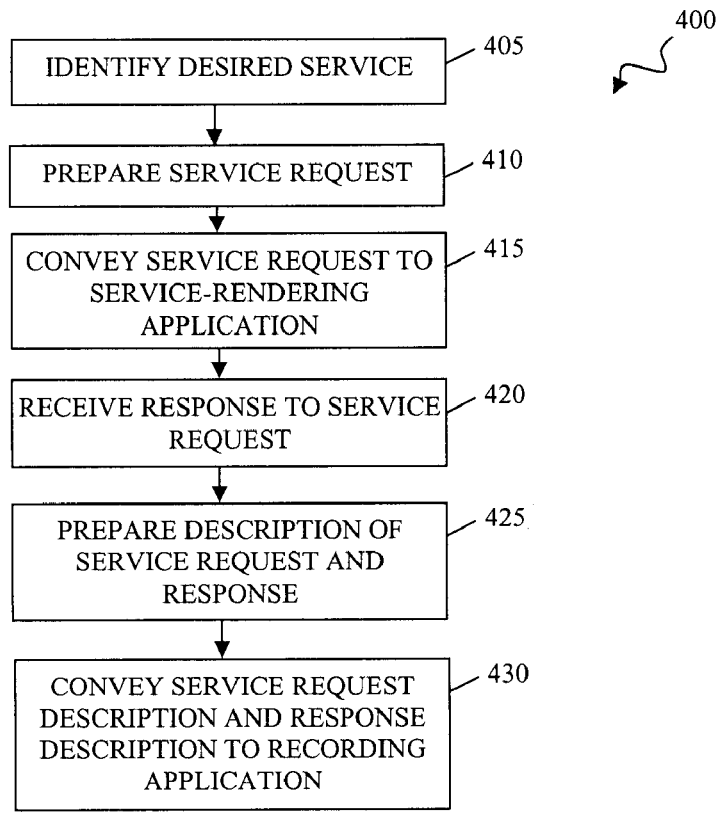
FIG. 4 is a flowchart of a process for creating a test of machine-readable instructions.

FIG. 1 is a schematic representation of an application landscape 100. Application landscape 100 includes one or more service-receiving applications 105, one or more service-rendering applications 110, one or more recording applications 115, and one or more playback applications 120. Service-receiving application 105 exchanges data 125 with service-rendering application 110 to request and receive services in the course of data processing activities. Recording application 115 receives and records descriptions 130 of the service requests made by service-receiving application 105. Recording application 115 can also receive and record descriptions of responses to service requests made by service-receiving application 105, as discussed further below. Since such service request descriptions 130 can be arbitrarily-sized, recording application 115 can be adapted to persist arbitrarily-sized objects. For example, recording application 115 can provide the functionality provided by HIBERNATE (available from Red Hat Middleware, LLC).

Recording application 115 can assemble the received service request descriptions and communicate the assembly in a log 135 of service request descriptions to playback application 120. The service request descriptions can be conveyed to recording application 115 synchronously or asynchronously with the service requests themselves, by a push or a pull mechanism. Playback application 120 can receive log 135 and use the service request descriptions to test 140 service-rendering application 110. Test 140 can include the conveyance of a series of service requests to service-rendering application 110 and the receipt of a series of responses to the service requests from service-rendering application 110.

In one implementation, service rendering application 110 includes an application program interface 145 that can receive and respond to service requests in data 125 and test 140. An application program interface (API) is an interface that is provided by one application to accommodate service requests from another application. An API can include a set of definitions of elements used to accommodate service requests. For example, functions, procedures, subroutines, variables, data structures, and/or class descriptions can be defined to provide access to the data processing activities of an application. One example is the API of an operating system. Other applications can use an operating system's API to, e.g., allocate memory and access files.

FIG. 2 is a schematic representation of data 125 which is exchanged between service-receiving application 105 and a service-rendering application 110. Data 125 includes a collection of service requests 205, 210, 215 made to API 145 and a series of responses 220, 225, 230 received from API 145. Each service request 205, 210, 215 can be a function-call message that identifies a function or other set of data processing activities to be performed by service-rendering application 110, as well as any values that are to be used in the performance of those activities. Each response 220, 225, 230 can be a return-value message that identifies any values yielded by the performance of those data processing activities, along with an identification of the data processing activities and/or the service request. In the illustrated data 125, response 220 responds to request 205. Response 225 responds to request 210. Response 230 responds to request 215. In some implementations, as illustrated, requests 205, 210, 215 and responses 220, 225, 230 can be streamed independently, i.e., without waiting for the roundtrip of a prior request and response to be completed.

Not every service request made by service-receiving application 105 necessarily results in the conveyance of data to service-receiving application 105. For example, a service-rendering application 110 can respond to the request by conveying information to another application or to memory.

FIG. 3 is a schematic representation of example service request descriptions 130 that can be conveyed to recording application 115 from service-receiving application 105. Service request descriptions 130 can include the service requests themselves or a redaction or other description of the service requests. For example, as illustrated, service request descriptions 130 can include the service requests 205, 210, 215 made to API 145 by service-receiving application 105. Service request descriptions 130 can thus identify a set of data processing activities to be performed by service-rendering application 110 and values that are to be used in the performance of those activities.

FIG. 4 is a flowchart of a process 400 for creating a test of machine-readable instructions. Process 400 can be performed by one or more data processing systems in accordance with the logic of instructions set forth in one or more applications. For example, process 400 can be performed in accordance with the logic of one or more service-receiving applications 105 in application landscape 100 (FIG. 1).

A system performing process 400 can identify a desired service that is provided by a service rendering application at 405. The identification can be part of the data processing activities of a service-receiving application.

The system performing process 400 can prepare a service request to request the provision of the identified service by the service-rendering application at 410. As discussed above, a service request can include an identification of a set of data processing activities to be performed by service-rendering application, as well as any values that are to be used in the performance of those activities. The system can convey the service request to the service-rendering application at 415. For example, the system can issue an API call to the API of the service-rendering application. The system performing process 400 can receive a response to the service request from the service-rendering application at 420. For example, the response can provide values yielded by the performance of the requested data processing activities.

The system performing process 400 can prepare a description of the service request conveyed to the service-rendering application and the response received from the service request description at 425. The descriptions can be, e.g., copies of the service request and response or redactions thereof. The system can convey the service request and the response descriptions to a recording application at 430.

Process 400 can be performed multiple times over the course of multiple service requests. Moreover, descriptions need not be prepared and conveyed for every service request and response exchanged between a service-receiving application and a service-rendering application. For example, descriptions of a subset of all service requests and responses can be prepared and conveyed, e.g., by only denoting a subset of all service-requesting subroutines in the service requesting application as being of interest. For example, in the context of JAVA, byte code injection can be used to instrument selected classes, as discussed further below.

The preparation and conveyance of descriptions can also be delimited in time or otherwise. For example, the reaching of a breakpoint in a set of machine-readable instructions, a determination of whether additional services are likely to be requested, the number of service request descriptions that have been conveyed to the recording application, and/or the time period over which service request descriptions that have been conveyed to the recording application can be used to stop the preparation and conveyance of descriptions.

Process 400 can be performed during the standard, operational work-day activities of service-receiving applications. In particular, a service-receiving application can operate as it otherwise would, i.e., interacting with human users and other applications while performing data processing activities. Thus, the service request descriptions can be representative of those work-day activities and the typical interactions between a service receiving application and a service-rendering application.

Figure 5:
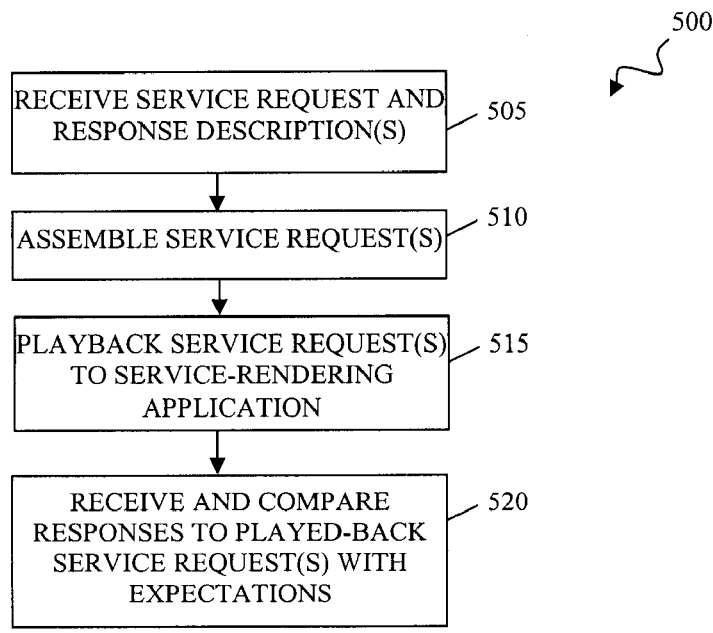
FIG. 5 is a flowchart of a process for creating a test of machine-readable instructions.

FIG. 5 is a flowchart of a process 500 for testing machine-readable instructions. Process 500 can be performed by one or more data processing systems in accordance with the logic of instructions set forth in one or more applications. For example, process 500 can be performed in accordance with the logic of one or more recording applications 115 and/or playback applications 120 in application landscape 100 (FIG. 1).

The system performing process 500 can receive one or more service request and response descriptions at 505. The descriptions can be received from one or more applications, such as one or more service-receiving applications 105 in application landscape 100 (FIG. 1) that are performing process 400 (FIG. 4). As discussed above, the descriptions can be copies of the service requests and response themselves. The descriptions can be received as a collection or serially over a period of time. The system can store the received descriptions as they are received.

The system performing process 500 can assemble the service requests described by the received descriptions at 510. The assembly can include arranging service requests into a file or other format that is suitable for conveyance to a service rendering application. For example, if necessary, service request descriptions can be used to generate corresponding service requests which can then be arranged as a series of API calls. As another example, if necessary, time delays can be added between service requests and relationships between the content of service requests can be established. For example, rules for defining one or more values in a function call based on another value in another function call can be defined. As another example, rules for defining one or more values in a function call based on input from a user can be defined. The system performing process 500 can play back the assembled service requests to service-rendering application at 515. The play back can include conveying individual services requests serially to the API of a service-rendering application.

The system performing process 500 can also receive and compare the responses to the played-back service requests with expected responses at 520. The result of such comparisons will thus test the ability of the service-rendering application to respond to service requests appropriately. Discrepancies between the responses to the played-back service requests and the expected responses can be reported as errors, e.g., to a developer or other user.

Any of a number of different expected responses can be used for the comparisons. For example, the responses to the played-back service requests can be compared to the response descriptions received at 505 to determine if the service providing application is operating in the same manner as when the described responses were provided. Such comparisons can be used in contexts such as when changes are made to a service-rendering application or when a first service-rendering application is replaced or updated with a second service-rendering application. This is especially useful when the service-rendering application is part of a larger system of applications, such as enterprise software and the like, where communications between applications must meet expectations. As another example, the responses to the played-back service requests can be compared to a set of expected responses defined by a developer or other user.

In some implementations, the responses from the service-rendering application to the assembled service requests can be stored as a test result and later used to analyze the rendition of services by the service-rendering application. For example, the record can be compared with services subsequently provided by the same or different service-rendering applications.

As discussed above, the service requests described in the service request descriptions received by the system performing process 500 can be representative of the typical interactions between a service receiving application and a service-rendering application. The service request assembly that is played back to the service-rendering application can thus also be representative of those same interactions.

Figure 6:
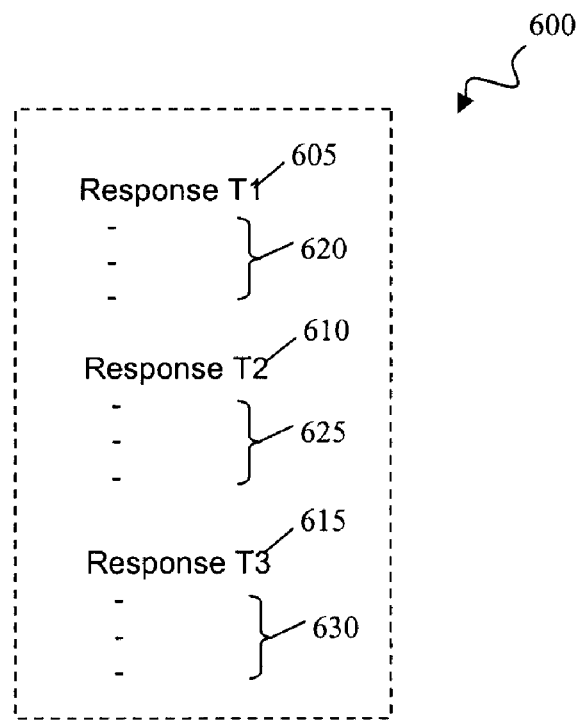
FIG. 6 is a schematic representation of an example test result record that can be formed by one or more applications.

FIG. 6 is a schematic representation of an example test result record 600 that can be formed by one or more applications performing process 500. For example, test result record 600 can be formed by playback applications 120 in application landscape 100 (FIG. 1).

Test result record 600 includes a collection of response identifiers 605, 610, 615 that are each associated with the contents of the corresponding response. In particular, response identifier 605 is associated with response contents 620, response identifier 610 is associated with response contents 625, and response identifier 615 is associated with response contents 630. Test result record 600 can be stored, e.g., as a file and compared with expected results or with the results of other test result records in testing the performance of a service-rendering application.

Figure 7:
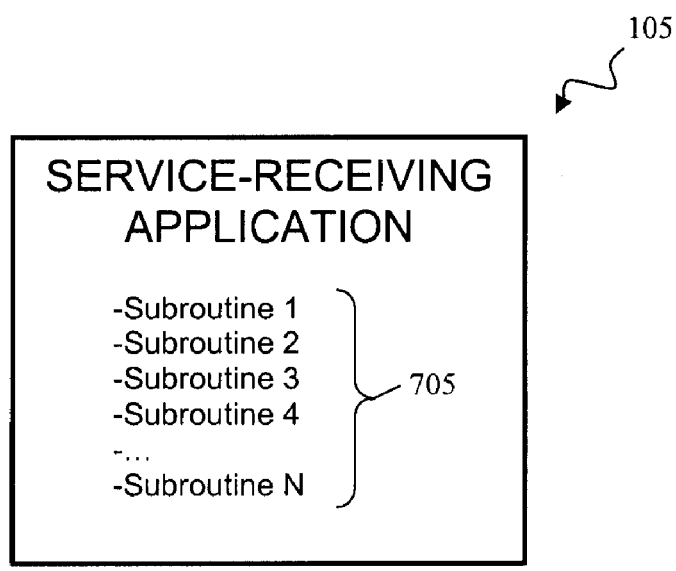
FIG. 7 is a schematic representation of service receiving application.

FIG. 7 is a schematic representation of service receiving application 105. Service receiving application 105 includes a collection of subroutines 705. A subroutine is a subset of the machine-readable instruction that form an application. A subroutine is generally dedicated to the performance of a task within the set of data processing activities performed by application. Examples of subroutines include functions, methods, procedures, and subprograms.

Figure 8:
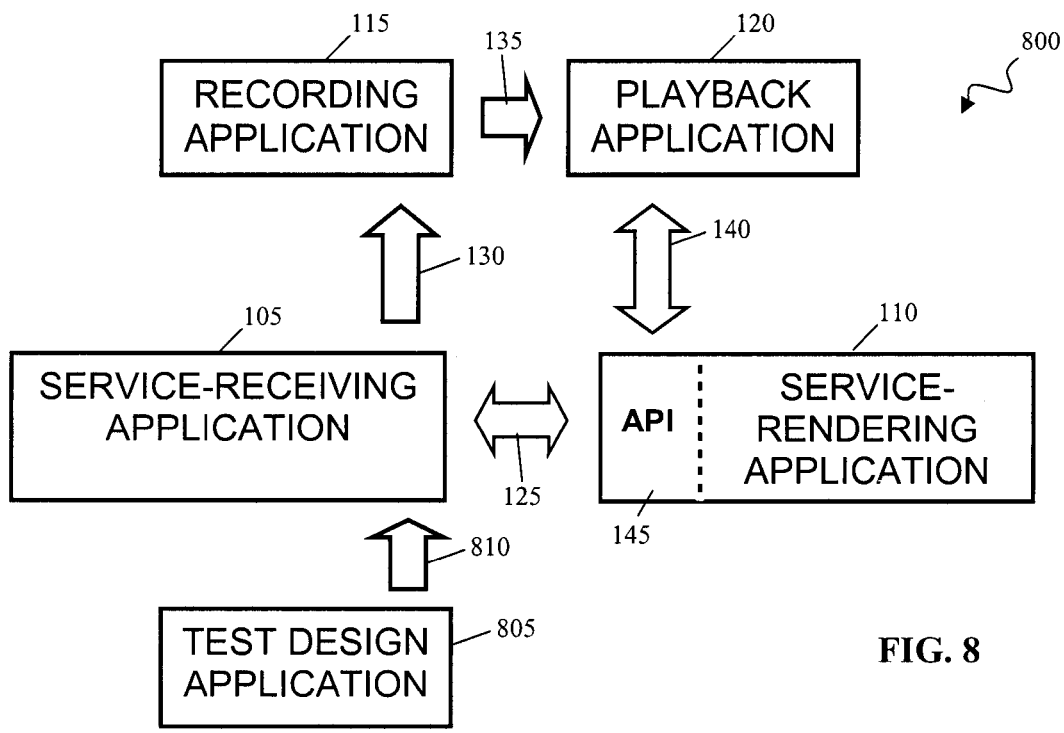
FIG. 8 is a schematic representation of an application landscape.

FIG. 8 is a schematic representation of an application landscape 800. In addition to one or more service-receiving applications 105, one or more service-rendering applications 110, one or more recording applications 115, and one or more playback applications 120, application landscape 800 also includes one or more test design applications 805. Test design application 805 is a set of data processing activities performed to design aspects of a test of machine-readable instructions. Test design application 805 can transmit data 810 to service-receiving application 105 to convey designed aspects of such a test to service-receiving application 105. Data 810 can be used in the testing of machine-readable instructions. For example, data 810 can be used to identify service requests whose descriptions are to be conveyed from service-receiving application 105 to recording application 115.

Figure 9:
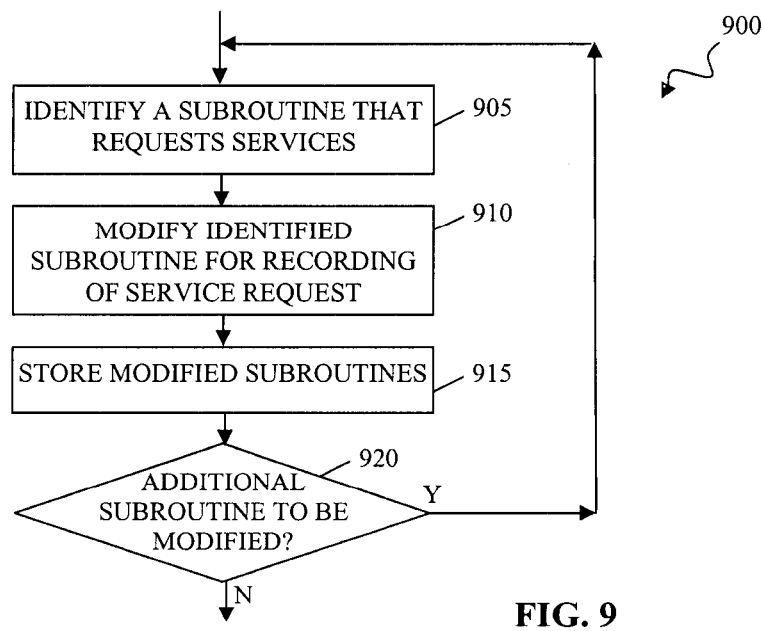
FIG. 9 is a flowchart of a process for designing a test of machine-readable instructions.

FIG. 9 is a flowchart of a process 900 for designing a test of machine-readable instructions. Process 900 can be performed by one or more data processing systems in accordance with the logic of instructions set forth in one or more applications. For example, process 900 can be performed in accordance with the logic of one or more test design application 805 in application landscape 800 (FIG. 8).

The system performing process 900 can identify a subroutine in an application that requests services at 905. The subroutine can be identified based on user input or automatically, i.e., without user input. For example, the system performing process 900 can present a list of subroutines in an application to a user and the user can select a subroutine from the list. As another example, the system performing process 900 can use rules and/or distinguishing characteristics of subroutines to identify a subroutine. For example, a subroutine that can request a particular type of service can be identified.

The system performing process 900 can modify the identified subroutine for the recording of a service request descriptions at 910. The modification can include adding instructions to the identified subroutine that direct a machine performing those instructions to convey a description of a service request to a recording application. The service request description can be conveyed synchronously or asynchronously with a service request, by a push or a pull. The modified subroutine can be stored at 915 for access during subsequent data processing activities by the application.

The system performing process 900 can determine if an additional subroutine is to be modified at 920. If so, the system returns to 905 to identify the additional subroutine. If not, the design of a test of machine-readable instructions can end.

In one implementation of process 900, the application that requests services is a Java application. The subroutines that are identified in the Java application are class files. Class files can be identified based on the role that the class files play in the Java application. For example, the paradigm of aspect-oriented programming can be used to identify class files that participate in addressing a concern of an application. A concern of an application is a subset of the functionality of the data processing activities of an application. The functionality of a concern can be modular in that it has little overlap with other functionality in the application. In some implementations, a list of different functionalities of the data processing activities of an application can be presented to a user and a user can select one or more functionalities for instrumentation. Class files can then be identified on the basis of the instrumentality selection.

A class file can be modified by instrumenting a class file. A class file can be instrumented by weaving calls to external coding into the Java byte code of a class file during class loading. For example, byte-code injection can be used to insert calls into service-receiving application that has been independently developed by others. The calls can direct that copies of method calls to an API of service-providing application, and responses to those method calls, be conveyed to an external recording application, which in turn is responsible for recording the calls and the responses.

Figure 10:
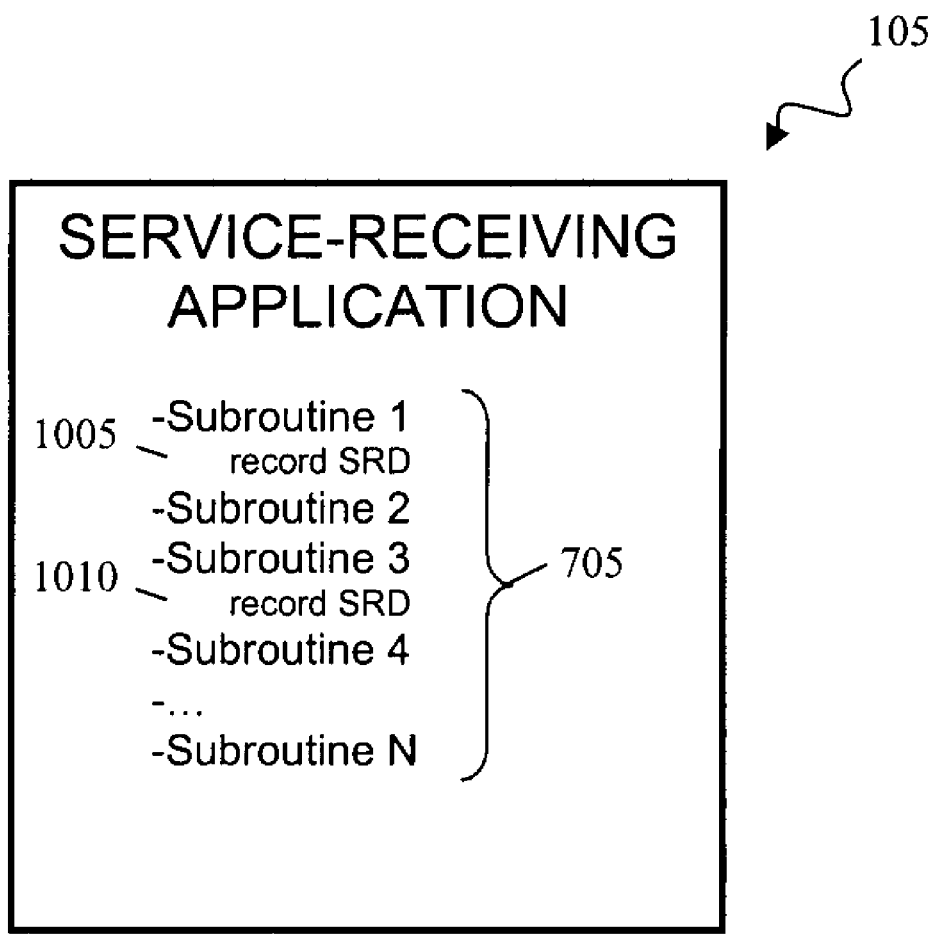
FIG. 10 is a schematic representation of a service receiving application after modification for the storage of service request descriptions.

FIG. 10 is a schematic representation of a service receiving application 105 after modification for the storage of service request descriptions. In particular, selected subroutines in collection 705 have been modified to record service request descriptions at 1005, 1010. The modifications can be, e.g., instrumentation of class files at 1005, 1010.

Figure 11:
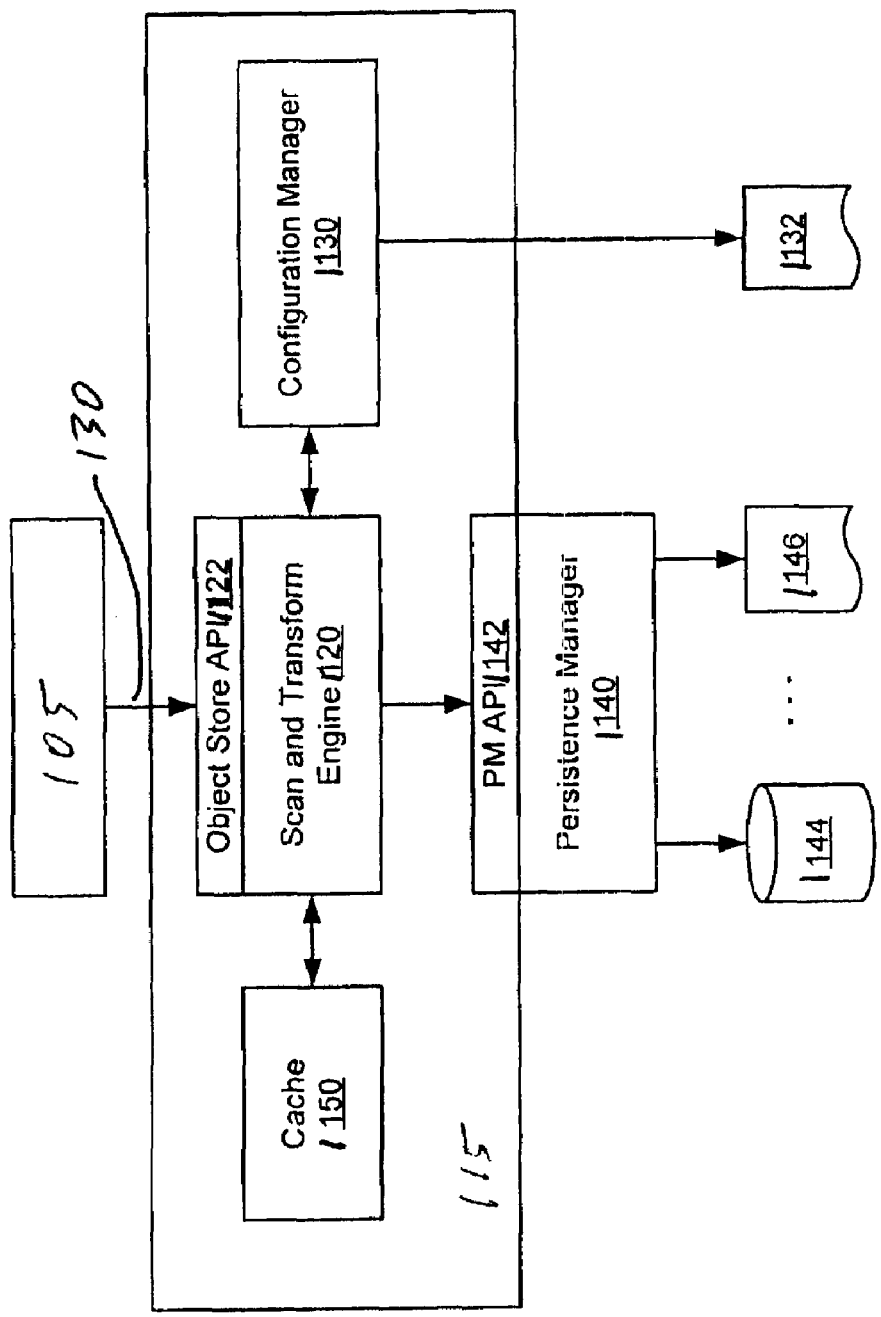
FIG. 11 is a block diagram of selected elements of a recording application.

FIG. 11 is a block diagram of the conveyance of descriptions 130 from service receiving application 105 and recording application 115 for storage. In some implementations, recording application 115 can be adapted to persist arbitrarily-sized descriptions 130. This is especially convenient when recording application 115 does not have prior knowledge of the size and content of descriptions 130. In such implementations, recording application 115 can be referred to as a persistence system.

Persistence system 115 stores and retrieves objects and object closures for one or more service receiving application 105. The term "object closure" refers to a set of Java objects containing at least one reachable object and zero or more objects that are transitively referenced by the reachable object. A reachable object is an object that can be retrieved either directly or indirectly from, for example, persistence system 115. As is further described below, in an embodiment, a "named handle" is a starting point for retrieving objects. An object can be retrieved directly using its handle (as is further described below). An object can be retrieved indirectly as part of an object closure. Objects that are not reachable are called unreachable. Persistence system 115 treats a single object as the special case of a one element object closure. Consequently, when referring to object closures in the text below, the single object case is subsumed even if it is not specifically mentioned. In addition, embodiments of the invention are described with reference to Java objects. It is to be appreciated that alternative embodiments may be directed to persisting objects written in other programming languages.

In an embodiment, persistence system 115 is part of a multi-tiered network. The multi-tiered network may be implemented using a variety of different application technologies at each of the layers of the multi-tier architecture, including those based on the Java 2 Enterprise Edition™ ("J2EE") specification (e.g., the Websphere platform developed by IBM Corporation), the Microsoft .NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001. None of these technologies, however, are required by an embodiment of the invention.

Persistence system 115 includes Scan and Transform Engine (STE) 1120, object store Application Program Interface (API) 122, configuration manager 1130, persistence manager API 1142, and cache 1150. In alternative embodiments, persistence system 115 includes more elements, fewer elements, and/or different elements. STE 1120 uses introspection to scan and transform object closures. The transformed object closure is stored in an intermediate data structure and passed to persistence manager 1140. STE 1120 is further discussed below with reference to FIG. 14 through FIG. 15.

In an embodiment, configuration manager 1130 provides STE 1120 with rules that define, at least in part, the scan and transform process. Configuration manager 1130 is further discussed below with reference to FIG. 18. Persistence manager 1140 (and its Application Program Interface (API) 1142) receives the intermediate data structure from STE 1120 and writes it to a persistent media such as database 1144, file system 1146, and the like. Different Persistence Managers may be implemented for different persistent media. Persistence manager 1140 is further discussed below with reference to FIGS. 17-18. In an embodiment, cache 1150 holds a subset of the objects persisted by system 115 to improve the performance of the system.

Figure 12:
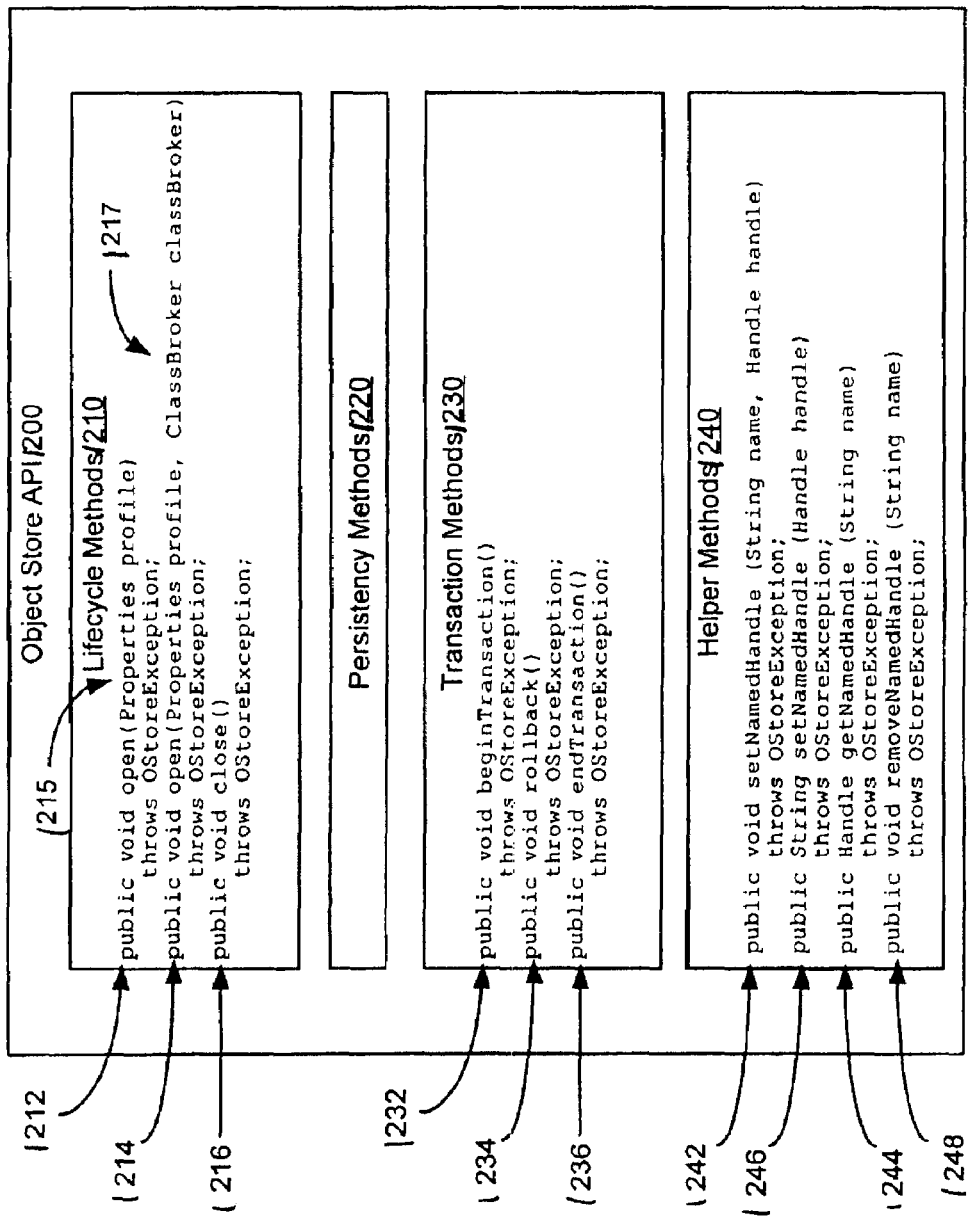
FIG. 12 is a block diagram illustrating the structure of an object store Application Program Interface (API).

Object store API 1122 provides the interface between application 105 and STE 1120. FIG. 12 is a block diagram illustrating the structure of object store API 200 according to an embodiment of the invention. Object store API 200 includes lifecycle methods 210, persistency methods 220, transaction methods 230, and helper methods 240. In an alternative embodiment, object store API 200 may be structured to include more sets of methods, fewer sets of methods, and/or different sets of methods.

Lifecycle methods 210 initiate and end access to a persistence system (e.g., persistence system 115, shown in FIG. 11). The illustrated embodiment of lifecycle methods 210 includes open methods 212 and 214 as well as close method 216. Open methods 212 and 214 open persistence system 115 prior to use. Open methods 212 and 214 take profile object 215 as a parameter. Profile object 215 includes profile information for persistence system 115 such as a PersistenceManager class, a data store identifier, a configuration file, a username, and a password.

The PersistenceManager class is the fully qualified class name of the persistence manager that is used (e.g., persistence manager 1140, shown in FIG. 11). A class typically has both a simple name and a fully qualified name. The simple name is the name given to the class in its definition. A "fully qualified" name also includes the name of the package of which the class is a part.

The data store identifier specifies which data store to use (e.g., database 1144 and file system 1146). The value of this property may depend on the persistence manager defined with the PersistenceManager class. For example, for a Java Database Connectivity (JDBC) persistence manager, the value of this property is a JDBC string pointing to a database (e.g., database 1144). For a file based persistence manager this could be a file name or the fully qualified name of a directory.

The "configuration file" refers to a name (e.g., the fully qualified name) of a configuration file containing one or more rules for defining the behavior of, for example, STE 1120. Referring again to FIG. 11, configuration manager 1130 uses this information to access and read the configuration file (e.g., configuration file 1132). In one embodiment, configuration file 1132 is an XML formatted file stored in a file system. In an alternative embodiment, configuration manager 1130 utilizes different media to store the configuration (e.g., "configuration store"). The rules defined in configuration file 1132 define, in part, the scan and transform process of STE 1120. Configuration file 1132 is further discussed below with reference to FIG. 18.

Open method 1214 is directed to applications that implement their own class loading. Persistence system 115 creates instances of application classes when retrieving persistently stored information. To create instances of application classes, persistence system 115 accesses the classes of the objects to be instantiated. The second parameter of open method 1214 (e.g., classBroker parameter 1217) enables persistence system 115 to have access to classes loaded by the application class loaders. In one embodiment, a class with a method Class class ForName (className) uses the application class loaders to find the required classes.

Close method 1216 closes persistence system 115. Closing persistence system 115 assures that clean-up operations, such as closing opened files or data bases, are properly executed to avoid data loss. Closing persistence system 115 also assures that system resources (e.g., memory, etc.) are returned to the system.

Persistency methods 1220 provide access to objects stored in persistence system 115. FIG. 13 is an illustration of persistency methods 1220 according to an embodiment of the invention. In an embodiment, store methods 1305 and 1310 persist data in persistence system 115. Store methods 1305 and 1310 first determine whether data (e.g., object 1315) is already stored. If the object is already stored in persistence system 115, then the object is updated. If the object does not yet exist in the system, it is inserted. For both update and insert operations the whole object closure defined by the object is persisted. In other words, not only the object itself, but also all referenced objects are recursively stored (or updated) in the system. In either case, the handle for the stored object, that is the object closure's anchor object, is returned.

A handle object is an instance of a class that implements handle. Handle instances are created by persistence system 115 rather than service receiving application 105, shown in FIGS. 1 and 11). The application uses the handles to retrieve stored objects. Nonetheless, handles themselves call be persisted explicitly, for example, for bootstrapping purposes. Such handles are called "named handles." An application can create named handles using special OStore methods to store a handle under a name. The application can choose the name by itself. If the application, for example, uses a hard-coded string it can read the named handle back from OStore the next time the application runs. Based on the named handle, the application can then read its data from OStore.

An application can store and retrieve handles in persistence system 115 using names (e.g., based on java.lang.String). Thus, named handles serve as externally accessible "starting points" for object closures, and are useful for initial object retrieval from persistence system 115. For example, an application could use the class name of the application main class for a named handle, to retrieve an initial object closure. Then, the application can use handles stored within the initial object closure to access further objects in persistence system 115 and other named handles to access further closures.

Store method 1310 is substantially similar to store method 1305 but it also includes rulesets parameter 1320. RuleSets parameter 1320 provides zero or more rule sets to define, at least in part, the behavior of STE 1120. More precisely, RuleSets parameter 1320 provides the name(s) of the rule stets. The rules/rule sets are defined in the rules/configuration file (e.g., configuration file 1132, shown in FIG. 11). These rule sets may augment or override default rules that are provided by, for example, a configuration file (e.g., configuration file 1132, shown in FIG. 11).

Retrieve method 1325 is used to retrieve an object from persistence system 115. In an embodiment, the caller identifies an object closure to retrieve with a handle (e.g., handle 1328). This handle is returned by store methods 1305 and 1310 during the store operation. In an alternative embodiment the retrieve method 1325 could have an additional parameter ruleset. This ruleset is identical to the rule set of store method 1310. The benefit of a rule set during a retrieve operation is to reduce the amount of data that has to be read from the data base. If, for example, for the retriever of an object closure only one member of the anchor object is of interest, a rule set call help to reduce the load on the data base: The rule set can prevent the embodiment from retrieving the whole object closure by excluding all members of the anchor object that refer to other objects. Such an alternative embodiment, however, cannot cache object closures retrieved with a rule set in the same way as object closures retrieved without a rule set: A later caller to retrieve is not aware of how the object closure was retrieved, and that it may be incomplete due to a rule set. Such, the cached object closure cannot be returned. There are at least two ways to handle objects retrieved with rule sets: a) do not cache them at all; b) cache them with the rule set that was used to retrieve them. In the latter case the cached object closure may only be returned in case the rule set used during the first retrieve operation is a subset of the rule set used during later retrieve operations.

Remove methods 1330 and 1335 remove objects from persistence system 100. Remove method 1330 identifies the object to be removed by passing its handle. Remove method 335 identifies the object to be removed by passing the object itself. Unlike store methods 1305 and 1310, remove method 1335 is not recursively invoked on referenced objects. That is, only the object itself and not the object closure is removed from persistence system 115. Removing an object from persistence system 115 may render objects of the object closure unreachable. Thus, persistence system 115 periodically triggers a mechanism similar to the Java garbage collection mechanism to remove unreachable objects. The actual cleanup mechanism is implemented by the persistence manager (e.g., persistence manager 1140, shown in FIG. 11). This mechanism can either be triggered periodically, or on demand, for example each time after the stored data is changed. In an alternative embodiment remove methods 1330 and 1335 could come with modified semantics and an additional parameter ruleset: In the alternative embodiment the remove methods would remove the whole object closure, while the rule set would limit the scope of the remove operation in analogy to the rules for store and retrieve.

RetrieveType methods 1340-1350 enable a caller to retrieve a set of object closures with common features through one operation. RetrieveType method 1340 retrieves all object closures of a specified class. The fully qualified class name is provided as a parameter for RetrieveType method 1340.

RetrieveType method 1345 is similar to RetrieveType method 1340 but it reduces the result set by applying a filter. The filter works on a very low level without restoring the actual objects. The entries in the filter data structure (e.g., HashMap) are name/value pairs. The name of an entry is a string denoting a member of the class. It has the format <fully qualified class name>.<member name>. The fully qualified class name is used to discriminate members in the inheritance hierarchy, for example, when members are overwritten in a subclass. The value of an entry is either a String, or, for primitive types, an instance of the respective boxing class. RetrieveType method 1345 returns those object closures that match the values in the filter data structure (e.g., HashMap).

RetrieveType method 1350 is similar to RetrieveType method 1345 but it employs a filter that is more powerful and less efficient. All instances of the class are retrieved as object closures from persistence system 115. The retrieved objects are then passed to the filter. The filter (e.g., a filter object) implements a method accept ( ), which can perform arbitrary computations on the object closures, and eventually returns a Boolean value. If the result for an object closure is true, then the object closure is added to the result, otherwise, it is ignored. In an alternative embodiment retrieveType methods could have an additional parameter ruleset. In analogy to the retrieve method, the rule set could be used to restrict the scope of the retrieve operation with the benefit of less load on the data base.

Referring again to FIG. 12, transaction methods 1230 are used to begin, end, and cancel transactions. Begin transaction method 1232, begins a transaction. Rollback method 1234 undoes the effect of all store and remove operations executed since the last begin transaction call. End transaction method 1236 is called to actually persist (e.g., commit) the effects of all store and remove operations executed since the last begin transaction call. In an embodiment, each begin transaction operation is matched by either an end transaction operation or a rollback operation (in an embodiment, service-receiving application 105, shown in FIGS. 1 and 11, satisfies this constraint).

In an embodiment, helper methods 1240 store and retrieve named handles. SetNamedHandle method 1242 stores a handle that is identified by its name. Similarly, getNamedHandle method 1244 retrieves a handle that is identified by its name. Method 1246 is similar to method 1242 except that it creates a unique name which is returned. Method 1248 removes a named handle.

Referring again to FIG. 11, STE 1120 examines and converts an object (e.g., a Java object) to an intermediate representation. The intermediate representation of the object is then passed to persistence manager 1140. The object examination process uses introspection (e.g., Java introspection). In one embodiment, the Java Reflection API is used to implement the examination. Since persistency is based on introspection, no preconditions or requirements, like implementing certain interfaces (e.g., java.io.Serializable), inheriting from certain classes, or providing metadata (e.g., table or field definitions), are imposed on the objects.

In an embodiment, the intermediate representation of an object is a data structure, with one entry per member of the object. Each entry includes a name/value pair. In one embodiment, the name of each entry is a string consisting of the member's fully qualified class name and the member's name, separated by a dot ('.'). Note that the member's class name is not necessarily the object's class. For members in which the object's class inherits from a superclass, the superclass's name is used. For example, consider two classes A and B. A defines a member a, and B inherits from A, and defines an additional member b. For an instance i of B, the name for b is B.b, while the name for a is A.a.

In one embodiment, the value of each entry is one of the boxing class of a primitive type, a string, or a handle. The term "boxing" refers to converting a primitive type to a reference type. In one embodiment, strings are represented by the java.lang.String class. As is further described below, handles may be used when a member is itself composed of sub-members (e.g., when the member is an array).

Three examples of scanning and transforming objects are discussed below. The first approach introduces a less complex example of an embodiment of the invention. The second approach introduces specific handling to improve performance (note that this is optional). The third approach refines the second by introducing rules to control what is stored and how it is stored. Note that numbers in brackets like "(n)" or "(n–m)" refer to code line n or lines n–m in the listings below. It is to be appreciated that the code listings that appear below are pseudo code (e.g., they resemble JAVA but are not "real" JAVA).

The first approach, as illustrated in Listing 1, shows the basic principle: All objects ultimately can be broken into arrays and primitive typed values like integer values (int), long values (long), floating point values (float), etc. When an object is stored (1) a distinction is made between arrays (2-3) and other kinds of objects (4-5).

When an object (which is not an array) is stored (8-19) all of the object's members are scanned, transformed, and stored. For each member (belonging to the object's class and its super classes) a dataset is created and collected in an intermediate data structure. The data structure is handed over to the persistence manager (17). There it is stored.

In an embodiment, a so-called class "Member" is used to collect a member's dataset: its name, value, type and the declaring class. The name is a string, the value is an object, the type and the declaring class are Java classes. The scan and transformation process guarantees that the value is only one of the following things: a string, an instance of a boxing class (Integer, Long, Float . . . ) or an instance of Handle. The type corresponds to the value: String.class, Integer.class, Long-.class ... Handle.class. The declaring class is necessary for the following reason: An object's member may not necessarily have been declared in the object's class itself. It may also have been declared in one of the object's superclasses. Consider two classes A and B. A declares a member a, and B inherits from A, and defines an additional member b. For an instance i of B, the declaring class of b is B while the declaring class for a (which is also present in i) is the declaring class in A.

In an embodiment, the intermediate data structure is an array of instances of Member. An object's member m can be both, of primitive type (an int, long, float ... ) or any kind of object. If m is of primitive type, an instance of Member is created and added to the intermediate data structure (13). Note that the primitive typed member is stored as an instance of its corresponding boxing type—for example int 42 is stored as Integer (42); nevertheless the primitive type's class is stored ("int" not "Integer") as type. The declaring class is the class declaring m (the object's class or one of int superclasses). If m is a kind of object then the algorithm is recursively called again (15) which ultimately results in a handle. The handle is stored instead of the object's value in a further instance of Member. This instance is added to the intermediate data structure, too (15). After all members of the object have been scanned and transformed, the intermediate data structure is handed over to the persistence manager where it is stored (17). Finally the object's handle h is returned to the caller (18). Note that handle h is not a result of storing the intermediate data structure—it is delivered by the persistence manger in a separate call (10). This is necessary for the following (simple) reason: If an object references itself (directly or indirectly) its handle must be known before storing its intermediate data structure, simply because the intermediate data structure contains the handle in one of the covered Member instances.

Storing an array (21-32) in fact resembles the handling of an object (8-19)—but with one important difference: An array does not have members like an object has, it has indexed elements. The scan and transformation process walks through all elements of an array and treats them in the same way it treats the members of an object: If element e is of primitive type it creates an instance of Member and adds it to an intermediate data structure (26), or—if element e is a kind of object—it (recursively) calls our algorithm again (28) and stores the resulting handle instead of the object's value in a further instance of Member. Note that, in the case of arrays, the array's class is taken as a member's declaring class (26) (28). The instance of Member is also stored in the intermediate data structure. Similar to the case of objects, the intermediate data structure is handed over to the persistence manager where it is stored (30). Finally the array's

---

LISTING 1

```
1  Handle store(Object o) {
2    if o isArray
3      return storeArray(o)
4    else
5      return storeObject(o)
6  }
7
8  Handle storeObject(Object o) {
9    IntermediateDataStruture i = new IntermediateDataStruture( )
10   Handle h = persistenceManager.createHandle(o.class)
11   for all members m of o (of the object's class and its super
     classes) {
```

---

-continued

LISTING 1

```
12   if m is of primitiveType
13     i.add(new Member(m.name, m (boxed), primitiveType.class,
       declaringClass)
14   else
15     i.add(new Member(m.name, store(m), Handle.class,
       declaringClass)
16   }
17   persistenceManager.insert(h,i)
18   return h
19 }
20
21 Handle storeArray(Array a) {
22   IntermediateDataStruture i = new IntermediateDataStruture( )
23   Handle h = persistenceManager.createHandle(a.class)
24   for all elements e of a {
25     if e is of primitiveType
26       i.add(new Member(toString(IndexOf(e)), e(being boxed),
         primitiveType.class, a.class)
27     else
28       i.add(new Member(toString(IndexOf(e)), store(e),
         Handle.class, a.class)
29   }
30   persistenceManager.insert(h,i)
31   return h
32 }
```

--- handle h is returned to the caller (31). Note that in the case of arrays instead of member names—which do not exist—an element's index is used as member name (26) (28).

The second approach adds to the first approach a specific handling for strings (see, e.g., code lines 34-35 and 68-74 below). This is done for performance reasons: Instead of storing a string ultimately as an array of characters (with probably hundreds of single character elements) strings are treated as strings. As all major data bases today have a native notion of strings, we assume that every persistence manager implementation also has a native notion of strings.

In an embodiment, when an object is stored (33) a distinction is made between strings (34-35), arrays (36-37), and other kinds of objects (38-39). Storing a string is handled as follows (68-74). The string is treated as a single-member object. The member is given the name "value". The member's value is the string. The member's class and declaring class is String.class (71). An instance of Member is created and added to an intermediate data structure. The intermediate data structure is handed over to the persistence manager where it is stored (72). Finally, the string's handle h is returned to the caller (73). Storing arrays and other kinds of objects is described above with reference to the first approach. Listing 2 illustrates selected aspects of the second approach.

The third approach extends the second (and the first) approach by introducing rules to control which and how things are stored (see, e.g., the italic parts of the code lines 75-126 below). The rules introduced in the third approach control whether a member is stored or not, whether the algorithm is applied recursively to a member object or not, and whether the elements of a container (like arrays, lists, sets, vectors ... ) are excluded from the algorithm.

It is possible to declare that a certain object's member (of primitive type or any kind of object) is to be excluded from being stored (92-93). This is done using OStore's rule file. As a result the member will not be stored and—as a consequence—will be defaulted to a member type specific default when retrieved from the database. An application for this kind of rule is to prevent irrelevant fields from being stored. One example is cached values that are computed and held redundantly. Other examples are class constants. They need not to be stored.

It is possible to declare that a certain object's member shall not be scanned recursively by our algorithm (97-98). (This rule is only applicable for members that are objects, not for primitive type members.) This is done using OStore's rule file. Instead the object's handle is taken from the cache (97). To keep the object store consistent, however, in an embodiment it is mandatory that a member has been scanned recursively and stored earlier, before it can be excluded. The reason is because then the object is cached and its handle can be retrieved from the cache. It is an error if the object is not in the cache. As introduced in the first approach the handle is stored instead of the object's value (98). Excluding a specific member from being recursively scanned is desirable, for example, when within a tree structure each object not only points to its children but also to its parent. If such a tree's top object is stored, the complete tree is scanned following the children references and scanning back along the parent references is redundant. Excluding the parent link via a rule prevents the STM 1120 from doing so.

It is possible to declare that a certain container's elements are not scanned recursively by the algorithm (99-102). This is done using OStore's rule file. Containers are objects like lists, sets, maps, vectors . . . and arrays. Ultimately all of the mentioned objects types store their elements within arrays. To exclude a container's elements from being scanned recursively the scan and transformation process is slightly modified by switching to the "doNotRecurseElements" mode. Therefore the doNotRecurseElements flag is set to true (100). After the container has been handled the mode is switched back by setting the doNotRecurseElements flag to false (102). The doNotRecurseElements flag is part of the "Flags" class—a simple data structure to cover boolean values (191-194). The structure is handed down recursively to the storeArray0 method. If the scan and transformation process is in mode "doNotRecurseElements" an array's element (which is not of primitive type) is not scanned but its handle is taken from the cache (119). The handle is stored instead of the object's value (119). To keep the object store consistent, however, in an embodiment it is mandatory that a member has been scanned recursively and stored earlier, before it can be excluded. The reason is because then the object is cached and its handle can be retrieved from the cache. It is an error if the object is not in the cache. One example for applying the exclusion rule is the update of a node in a tree. Assume a tree structure has been persisted in OStore. Each node holds a list of references to its children. Now one node in the tree is to be updated. If the member for the children list cannot be excluded from the scan and transformation process, the whole sub-tree below the node will be updated, too. Excluding the member from the scan and transformation process improves the efficiency of the store method. Listing 3 illustrates selected aspects of the third approach.

LISTING 2

```
33    Handle store(Object o) {
34      if o isInstanceOf String
35        return storeString(o)
36      if o isArray
37        return storeArray(o)
38      else
39        return storeObject(o)
40    }
41
42    Handle storeObject(Objeet o) {
43      IntermediateDataStruture i = new IntermediateDataStruture( )
44      Handle h = persistenceManager.createHandle(o.class)
45      for all members m of o (of the object's class and its super
          classes) {
46        if m is of primitiveType
47          i.add(new Member(m.name, m (being boxed),
          primitiveType.class, declaringClass)
48        else
49          i.add(new Member(m.name, store(m), Handle.class,
          declaringClass)
50      }
51      persistenceManager.insert(h,i)
52      return h
53    }
54
55    Handle storeArray(Array a) {
56      IntermediateDataStruture i = new IntermediateDataStruture( )
57      Handle h = persistenceManager.createHandle(a.class)
58      for all elements e of a {
59        if e is of primitiveType
60          i.add(new Member(toString(IndexOf(e)), e (boxed),
          primitiveType.class, a.class)
61        else
62          i.add(new Member(toString(IndexOf(e)), store(e),
          Handle.class, a.class)
63      }
64      persistenceManager.insert(h,i)
65      return h
66    }
67
68    Handle storeString(String s) {
69      IntermediateDataStruture i = new IntermediateDataStructure( )
70      Handle h = persistenceManager.createHandle(String.class)
71      i.add(new Member("value", s, String.class, String.class)
72      persistenceManager.insert(h,i)
73      return h
74    }
```

LISTING 3

```
75    Handle store(Object o) {
76      return store(o, new Flags( ))
77    }
78
79    Handle store(Object o, Flags flags) {
80      if o isInstanceOf String
81        return storeString(o, flags)
82      else if o isArray
83        return storeArray(o, flags)
84      else
85        return storeObject(o, flags)
86    }
87
88    Handle storeObject(Object o, Flags flags) {
89      IntermediateDataStruture i = new IntermediateDataStruture( )
90      Handle h = persistenceManager.createHandle(o.class)
91      for all members m of o (of the obiect's class and its super
          classes) {
92        if ruleManager.exclude(m)
93          continue with next member
94        else if m is of primitiveType
95          i.add(new Member(m.name, m (being boxed),
          primitiveType.class, declaring class)
96        else {
97          if ruleManager.doNotRecurse(m)
98            i.add(new Mamber(m.name, cache.get(m),
          Handle.class, declaringClass)
99          else if ruleManager.doNotRecurseElements(m)
100           flags.doNotRecurseElements = true
101           I.add(new Member(m.name, store(m, flags),
          Handle.class, declaringClass)
102           flags.doNotRecurseElements = false
103         else
104           i.add(new Member(m.name, store(m, flags),
          Handle.class, declaringClass)
```

-continued

LISTING 3

```
105        }
106      }
107      persistenceManager.insert(h, i)
108      return h
109    }
110
111    Handle storeArray(Array a, Flags flags) {
112      IntermediateDataStruture i = new IntermediateDataStruture( )
113      Handle h = persistenceManager.createHandle(a. class)
114      for all elements e of a {
115        if e is of primitiveType
116           i.add(new Member(tostring(IndexOf(e)), e (boxed),
```

-continued

LISTING 3

```
           primitiveType.class, a.class))
117        else {
118           if flags.doNotRecurseElements == true
119              i.add(new member(toString(IndexOf(e)), cache.get(e),
           Handle.class, a.class))
120           else
121              i.add(new Member(toString(IndexOf(e)), store(e, flags),
           Handle.class, a.class))
122        }
123      }
124      persistenceManager.insert(h.i)
125      return h
126    }
127
128    Handle storeString(String s) {
129      IntermediateDataStruture i = new IntermediateDataStruture( )
130      Handle h = persistenceManager.createHandle(String.class)
131      i.add(new Member("value", s, String.class, String.class)
132      persistenceManager.insert(h, i)
133      return h
134    }
```

FIG. 14 illustrates the process of generating an intermediate data structure, according to an embodiment of the invention. STE 1120 identifies the elements of object 400 using introspection. In one embodiment, object 1400 is a Java object and the Java Reflection API provides the introspection mechanism. Object 1300 includes elements 1302-1412.

Java objects consist of members having one of the following member types: primitive types (int, long, double . . . ) or objects—strings, arrays or other kinds of objects.

STE 1120 processes each member based, at least in part, on its member type. Table 1 provides processing rules for Java member types according to an embodiment of the invention. In an alternative embodiment, STE 120 may apply more rules, fewer rules, and/or different rules.

The rules shown above are sufficient to transform even complex object closures because all members of Java objects ultimately consist of primitive types and arrays. While strings might also be handled as character arrays, experience shows that the rule for strings shown above improves performance. This procedure is valid, because even the most primitive persistence managers have a native notion of strings.

TABLE 1

| Member Type | Processing Rule |
| --- | --- |
| Has a primitive type (byte, char, short, int, long, float, double, or boolean) | Create an instance of the member's boxing class with the member's value, and store it in the intermediate data structure. |
| Is of type String (e.g., java.lang.String) | Store the member as it is in the intermediate data structure. |
| Is a reference to an object of type Array | Scan and transform the referenced array by looping over all array elements, and recursively apply the algorithm to the array elements. Storing the transformed array returns a handle which in turn is stored in the intermediate data structure as a placeholder for the referenced array. |
| Is a reference to another object | Recursively apply this algorithm to scan and transform the referenced object. Storing the transformed object returns a handle which in turn is stored in the intermediate data structure as a placeholder for the referenced object. Cyclic references are detected and addressed. In an embodiment, this rule applies to both instances of a built-in Java class and a user defined class. |

Referring again to FIG. 14, table 1420 illustrates an intermediate data structure corresponding to object 1400. The entries in table 1420 correspond to instances of class Member (see the discussion above with reference to Listings 1-3). For each member of object 1400 (1402-1412) a corresponding instance of class Member is created (1422-1432). Each instance covers an object member's name (Name column), a representation of its value (Value column), a type (Type column) and the declaring class (DeclaringClass column). Object members of primitive type (1402,1404) are stored as objects of their corresponding boxing class (1422, 1424). The stored type is the original primitive type. Object members of any type of object (1406-1412) are transformed by the algorithm into further intermediate data structures (as illustrated by tables 1440, 1450, and 1460) which are stored by the persistence manager—finally resulting in handles (e.g., handle h1, h2, h3). Handles are stored instead of the object (1426-1432). The stored type is Handle. Note the special case of a self-reference: Via member "self" (1412) object 1400 references itself Consequently the intermediate data structure of object 1400 covers an instance of class Member storing the corresponding handle h0 of object 1400 (1432).

Updating objects works in substantially the same way as storing them for the first time. The main difference, with respect to the algorithm, is that instead of creating a new handle for objects that are going to be stored, the object's handle is read from the cache. All objects already having been stored or having been read from the database (which means that they also already have been stored some time ago) are available in the cache as long as the application is accessing them. So instead of asking the persistence manager for a new handle (10) (23) (44) (57) (70) (90) (113) (129), OStore asks the cache for the handle. Finally instead of calling persistenceManager.insert (h,i) (17) (30) (51) (64) (72) (107) (124) (132) Ostore calls persistenceManager.update (h,i)

When an object is retrieved the cache is checked at first (See, e.g., code line 136, show in listing 4) whether the object is already available or not. If yes, it simply can be returned. If not, at first the object's class is determined. The persistence manager (and only the persistence manager) is able to interpret a handle and to return the class of the object that corresponds to the handle (139). Dependent on the class a string (140-141) an array (142-143) or an object of another type (144-145) is retrieved.

To retrieve a string (148-152) its intermediate data structure is first retrieved from the persistence manager (149). The intermediate data structure of a string only has a single element—an instance of class Member. This instance's value member is taken to create a new string and to return it to the caller (151).

To retrieve an array (168-180) the array's class is first determined with the help of the persistence manager (169). After that the array's intermediate data structure is retrieved from the persistence manager (170). Then a new array with the required size is created (171). Now all instances of class Member—covered by the intermediate data structure—are evaluated (172-178): A Member instance's "name" member determines the related array's element index (173). A Member instance's "value" member determines the related array element's value (175). Note that if the value is a handle at first the corresponding object has to be retrieved. Therefore the retrieval process is called recursively (175)—ultimately resulting in the object represented by the handle. The retrieved object is assigned to the array's element (175). If the value is not a handle—which means that originally the element's value was of primitive type—the Member instance's "value" member can be assigned directly. Note that because the Member class stores all primitive typed values wrapped by it's boxing class, it is necessary to convert a boxing class object to a primitive type value before the assignment. When all elements of the arrays have been restored it is returned to the caller (179).

To retrieve an object (which is not an array) the object's class is first determined with the help of the persistence manager (155). After that the object's intermediate data structure is retrieved from the persistence manager (156). Then a new object is created (157). Creating the object is further described below with reference to FIG. 15. Now all

LISTING 4

```
135 Object retrieve(Handle h) {
136     Object object = cache.get(handle);
137     if object != null
138         return object
139     Class class = persistenceManager.getClass(h)
140     if class is String
141         return retrieveString(h)
142     else if class is an array class
143         return retrieveArray(h)
144     else
145         return retrieveObject(h)
146 }
147
148 Object retrieveString(Handle h) {
149     IntermediateDataStruture i = persistenceManager.select(h)
150     for the only element e of i
151         return new String (e.getValue)
```

-continued

LISTING 4

```
152 }
153
154 Object retrieveObject (Handle h) {
155     Class c = persistenceManager.getClass(h)
156     IntermediateDataStruture i = persistenceManager.select(h)
157     Object o = newInstance(c)
158     for all elements e of i {
159         Field f = getField(c, e.getName( ), e.getDeclaringClass)
160         if e.getValue( ) isInstanceOf Handle
161             f.set(o, retrieve(e.getValue( )))
162         else
163             f.set(o, e.getValue( ))
164     }
165     return o
166 }
167
168 Object retrieveArray (Handle h) {
169     Class c = persistenceManager.getClass(h)
170     IntermediateDataStruture i = persistenceManager.select(h)
171     Object o = Array.newInstance(c, number of elements of i)
172     for all elements e of i {
173         int index = valueOf(e.getName( ))
174         if e.getValue( ) isInstanceOf Handle
175             Array.set(o, index, retrieve(e.getValue( )))
176         else
177             Array.set(o, index, e.getValue( ))
178     }
179     return o
180 }
181 public class Member {
182     private String name;
183     private Class type;
184     private Object value;
185     private Class declaringClass;
186     public Member (String name, Object value, Class type, Class declaringClass} {
187         ...
188     }
189     ...
190 }
191 public class Flags {
192     public boolean doNotRecurseElements;
193     ...
194 }
``` instances of class Member—covered by the intermediate data structure—are evaluated (158-164). This process works in substantially the same way as in the case of an array (described above). The difference is that the final assignment is done to an object's members instead of an array's elements (161) (163). Listing 4 illustrates selected aspects of retrieving an object according to an embodiment of the invention.

FIG. 15 illustrates a simplified coding example for locating an appropriate constructor for instantiating the class created above in Listing 4. An attempt to obtain a default constructor is shown at 1528. If a default constructor is not located, a configuration file (e.g., configuration file 1132, shown in FIG. 11) is checked to see whether a specific constructor has been selected for the class at 1530. If there is no default constructor and no specific constructor is selected in the configuration file, then the first constructor that can be for found for the class (e.g., for class cls) is used at 1532. An attempt to execute the constructor is made at 1534. If an error occurs, then the class is not instantiated as shown by 1536. Otherwise, the object is returned at 1538.

Referring again to FIG. 11, persistence manager 1140 receives the intermediate data structure from STE 1120. Persistence manager 1140 then writes the data to a data store (e.g., database 1144 or file system 1146). In contrast to the other elements of persistence system 115, persistence manager 1140 works on an object basis. That is, rather than storing and retrieving entire object closures, persistence manager 1140 operates on the intermediate data structure of one object at a time. Typically, there is a different implementation of persistence manager 1140 for each type of data store. Persistence manager API 1142, therefore, defines an interface that can be implemented in multiple ways.

Figure 16:
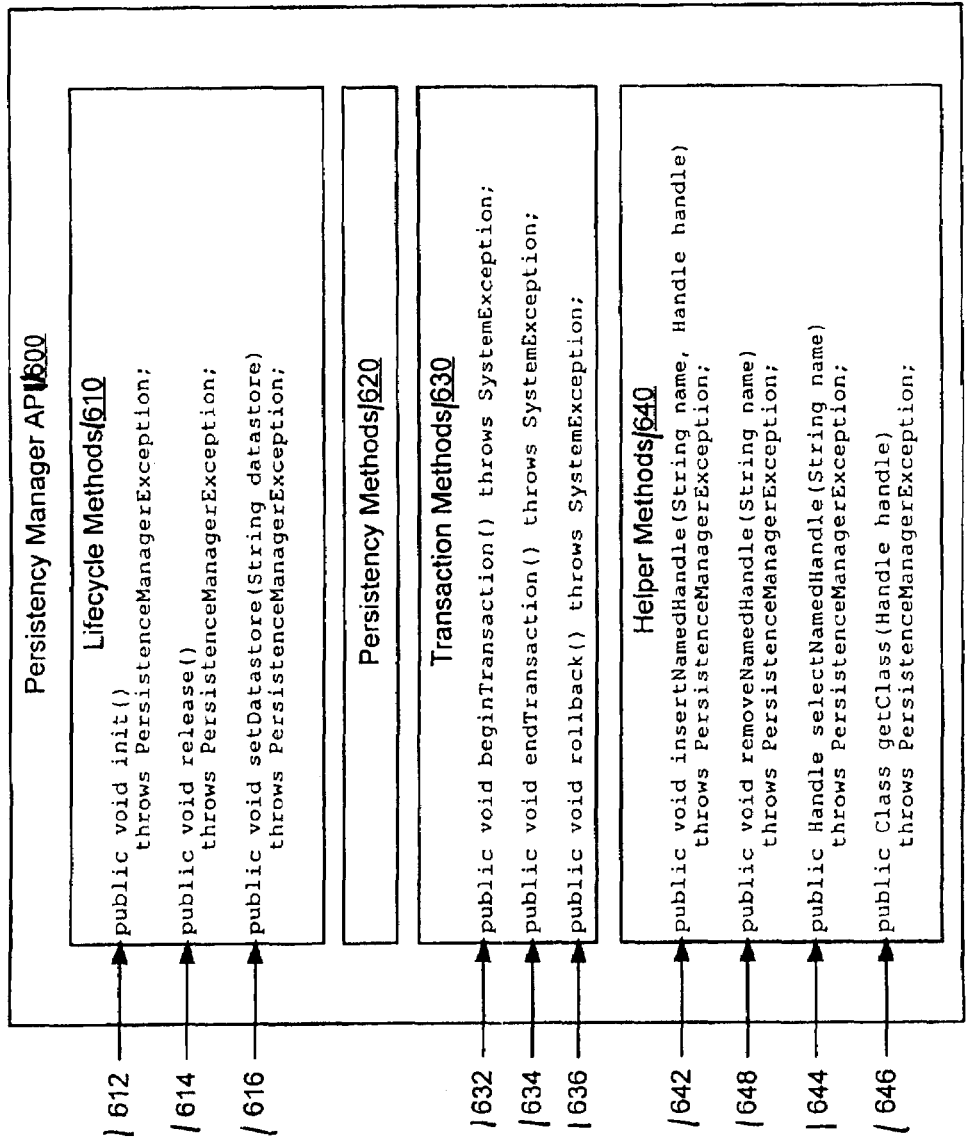
FIG. 16 is a block diagram illustrating the structure of a persistence manager API.

FIG. 16 is a block diagram illustrating the structure of persistence manager API 1600 according to an embodiment of the invention. The illustrated embodiment includes lifecycle methods 1610, persistency methods 1620, transaction methods 1630, and helper methods 1640. In an alternative embodiment, persistence manager API 1600 may include More sets of methods, fewer sets of methods, and/or different sets of methods.

Lifecycle methods 1610 include initiate method 1612, release method 1614, and setDatastore method 1616. Initiate method 1612 is used to initialize a persistence manager prior to using it. Release method 1614 releases the persistence manager after it is used so that resources can be returned to the system and cleanup, as needed, can be implemented. SetDatastore method 1616 is used to define the data store for the persistence manager. This is a persistence manager specific string denoting the location where the data is stored (e.g., a JDBC string pointing to a database or a qualified name of a directory).

FIG. 17 is a block diagram illustrating persistency methods 1620. When an object is stored, STE 1120 provides a data structure with all of the object's members to the persistence manager. Before the data structure is inserted, a corresponding handle is generated to identify the data structure. In an embodiment, createHandle method 1710 creates the handle based on the parameter className. In one embodiment, createHandle method 1710 returns a unique handle that can be used to identify the object inside the persistence manager. When an object is stored, the objects referenced by the stored object are stored handles. Thus, when an object directly or indirectly references itself, its handle is created before it is stored.

Insert method 1720 inserts an object (or rather its corresponding data structure) into the persistence manager. In an embodiment, insert method 1720 takes as a parameter a handle created by createHandle method 1710 to identify the inserted object. Update method 1730 is used to update objects that were previously stored. The object is identified by its handle, which was created when the object was inserted.

Delete method 1740 deletes an object that is stored in a data store. The object is identified by its handle, which was created when the object was inserted. In an embodiment, only the object identified by the handle is removed. All other objects of the object closure remain unchanged. Select method 1750 returns an object (or rather its corresponding data structure) stored in the data store. The object is identified by its handle, which was created when the object was inserted.

In an embodiment, selectHandles method 1760 returns the handles of all objects of a certain class stored in the persistence manager. The set of matching objects can be reduced by specifying a filter. In one embodiment, the provided filter is an object of type HashMap. Filters are further discussed above with reference to FIG. 13.

Referring again to FIG. 16, transaction methods 1630 are used to begin, end, and cancel transactions. Begin transaction method 1632, begins a transaction. Rollback method 1634 undoes the effect of all store and remove operations executed since the last begin transaction call. End transaction method 1636 is called to actually persist (e.g., commit) the effects of all store and remove operations executed since the last begin transaction call. In an embodiment, each begin transaction operation is matched by either an end transaction operation or a rollback operation. This constraint is fulfilled by service requesting application 105, show in FIGS. 1 and 11).

In an embodiment, helper methods 1640 store and retrieve named handles. For example insertNamedHandle method 1642 stores a handle that is identified by its name. Similarly, selectNamedHandle method 1644 retrieves a handle that is identified by its name. Method 1648 removes a named handle. In an embodiment, getclass method 1646 returns the class (e.g., java.lang.Class) of the object identified by the provided handle. In an embodiment, only the persistence manager is able to interpret a handle.

Referring again to FIG. 11, configuration manager 1130 provides a mechanism to control STE 1120 in a rule based way. In an embodiment, the rules are, for example, defined in a configuration file 1132. Configuration file 1132 is, for example, an XML file. The path to the configuration file is handed over to persistence system 115 as one of its profile parameters when it is opened.

In an embodiment, the following rules are supported: excluding a specific member from being stored; excluding a specific member from being recursively scanned; and excluding the elements of a specific container from being scanned. In an alternative embodiment, more rules, fewer rules, and/or different rules are defined. Excluding a specific member from being stored is desirable, for example, when the member references runtime data that should not become part of the persistent store (e.g., cached data, rendered data, etc.). Excluding a specific member from being recursively scanned is desirable, for example, when within a tree structure each object not only points to its children but also to its parent. If such a tree's top object is stored, the complete tree is scanned following the children references and scanning back along the parent references is redundant. Excluding a container's elements from being scanned is desirable, for example, for vectors because vectors store references to their elements in an element array. Whenever a new element is added to a vector, it is not necessary to update all elements of the vector. Rather, it is sufficient to insert the new element and update the element array, which is already stored.

FIG. 18 illustrates a configuration file according to an embodiment of the invention. Rules are either mandatory or optional. A mandatory rule is always applied to the members of an object. An optional rule is only applied if it is explicitly requested (e.g., by rulesets parameter 1320, shown in FIG. 13). In one embodiment, optional rules are organized as rules sets. In the illustrated embodiment of configuration file 1800, rules 1805-1815 are mandatory rules. The rules shown in rule set 1820, however, are optional rules.

Figure 19:
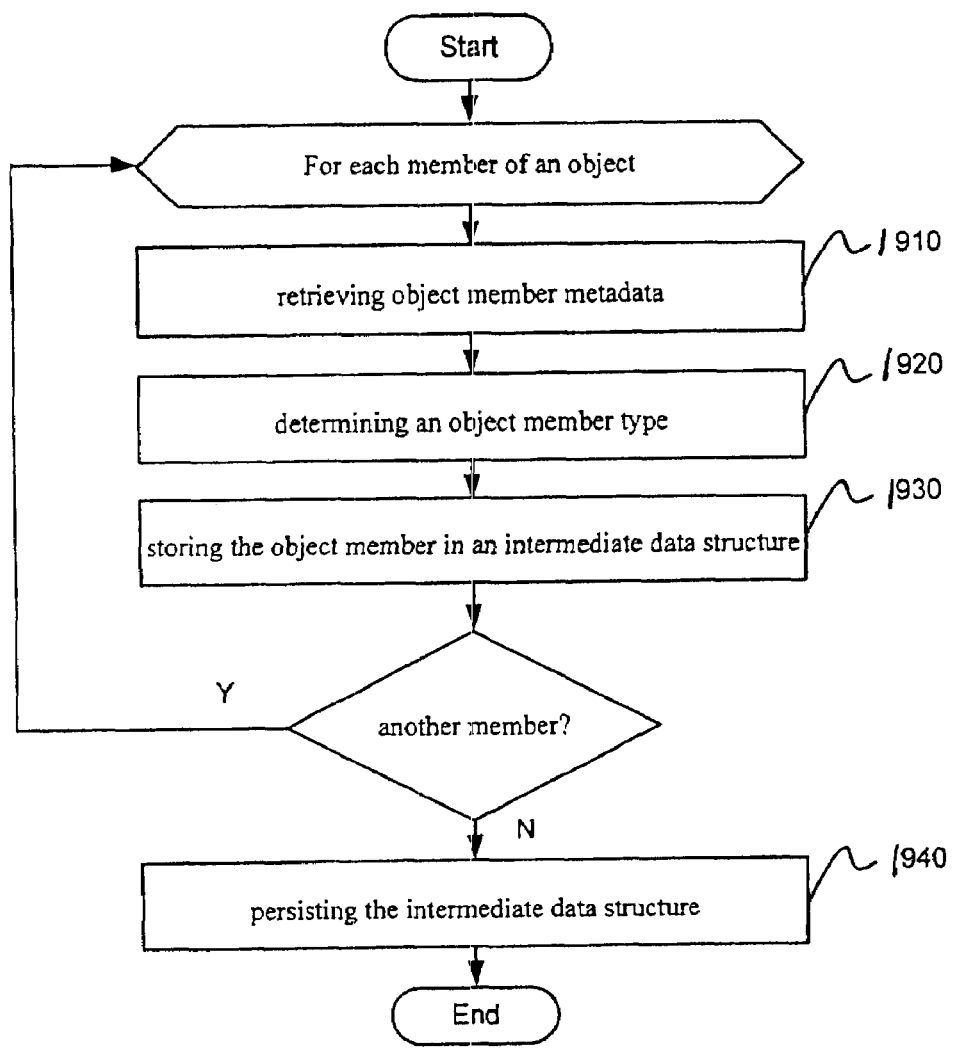
FIG. 19 is a flow diagram illustrating certain aspects of method for persisting an object.

Turning now to FIG. 19, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 19 is a flow diagram illustrating certain aspects of method for persisting an object according to an embodiment of the invention. A persistence system (e.g., persistence system 115, shown in FIG. 11) persists an object having one or more object members. In an embodiment, a Scan and Transform Engine (e.g., STE 1120, shown in FIG. 11) scans and transforms each member of the object. Referring to process block 1910, object introspection is used to retrieve object metadata. Object metadata includes, for example, object member names. Referring to process block 1920, an object member type is determined based at least in part on the retrieved object member metadata. For example, the object member type may be used to distinguish whether the object member is a primitive type, array, or reference to another object.

Referring to process block 1930, each object member is stored in an intermediate data structure based, at least in part, on its object member type. Table 1 illustrates an algorithm for storing object members according to an embodiment of the invention. As discussed above with reference to FIG. 18, mandatory and/or optional rules may also be used to determine whether and how to transform and store an object member.

Referring to process block 1940, the intermediate data structure is persisted to a data store. The data store may be a database, a file system, and/or other store capable of providing non-volatile storage. In one embodiment, a persistence manager API provides an interface to one of several types of persistence managers. Each persistence manager is responsible for storing the information contained in the intermediate data structure onto a particular media.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, sets of machine-readable instructions can be grouped in ways other than set forth here. For example, instructions denoted as being found in two or more applications can be combined into a single application, or the functionality of what is denoted as a single application can be performed by multiple applications. For example, the recording functionality of a recording application 115 and the playback functionality of a playback application 120 can be combined into a single application. As another example, the recording functionality of a recording application 115, the playback functionality of a playback application 120, and the test design functionality of test design application 805 can be combined into a single application.

As another example, process steps can be performed in different order and yet meaningful results can still be achieved. For example, multiple subroutines can be identified, modified, and stored in a batch, rather than one at a time as shown in process 900. Accordingly, other implementations are within the scope of the following claims.

What is claimed is:

1. A method comprising:
 identifying without user input a subroutine in a set of machine-readable instructions that can request a service from a service provider using rules and/or distinguishing characteristics of subroutines;
 modifying the identified subroutine to convey a description of a service request to a recorder; and
 storing the modified subroutine so that the modified subroutine is accessed during subsequent data processing activities and the description of the service request is conveyed to the recorder in response to a request for the service from the service provider during the data processing activities.

2. The method of claim 1, wherein identifying the subroutine comprises identifying a collection of class files that participate in addressing a concern of the set of machine-readable instructions.

3. The method of claim 1, wherein modifying the identified subroutine comprises instrumenting a collection of class files to convey the description of the service request to an external recording application.

4. The method of claim 1, wherein modifying the identified subroutine comprises instrumenting the identified subroutine to convey a description of a response to the service request to an external recording application.

5. The method of claim 1, wherein modifying the identified subroutine comprises modifying the identified subroutine to send the request for the service to both the service provider and the recorder.

6. An article comprising one or more machine-readable media storing instructions operable to cause one or more machines to perform operations comprising:
- modifying, without user input, machine-readable instructions to record descriptions of requests for services, wherein the services are requested from one or more service providing applications;
- performing workday operations in accordance with the modified machine-readable instructions and recording the descriptions of service requests made during those workday operations; and
- playing back the described service requests to the one or more service providing applications to test the one or more service providing applications;
- wherein the recording of the descriptions of service requests includes adding time delays between the service requests to establish relationships between content of the service requests.

7. The article of claim 6, wherein:
- the operations further comprise assembling the recorded descriptions of service requests into an assembly of service requests; and
- playing back the described service requests comprises playing back the assembly of service requests according to the added time delays.

8. The article of claim 6, wherein modifying the machine-readable instructions comprises modifying the machine-readable instructions to convey copies of the requests for services to the recorder.

9. The article of claim 6, wherein modifying the machine-readable instructions comprises:
- identifying a subset of the subroutines in the machine-readable instructions; and modifying the subset.

10. The article of claim 6, wherein modifying the machine-readable instructions comprises instrumenting a collection of class files to convey the description of the service request to an external recording application.

11. The article of claim 6, wherein the operations further comprise comparing services provided by the one or more service providing applications to expectations to test the one or more service providing applications.

12. An article comprising one or more machine-readable media storing instructions operable to cause one or more machines to perform operations comprising:
- instrumenting a collection of class files so that, in response to method calls being made to an application program interface by an application that requests services over the application program interface, identifications of the method calls and parameters with which the methods were called are to be described to a recorder;
- performing data processing activities with the application so that identifications and parameters in accordance with the performance are described to the recorder for recording; and
- playing back the method calls with the recorded identifications and parameters to the application program interface to test the application program interface;
- wherein instrumenting the collection of class files comprises weaving calls to external coding into the class files in the collection.

13. The article of claim 12, wherein instrumenting the collection of class files further comprises receiving a user selection of class files to be instrumented.

14. The article of claim 13, wherein receiving the user selection comprises:
- identifying a collection of different functionalities of the data processing activities of an application to the user;
- receiving a user selection of one or more functionalities in the collection; and
- identifying class files to be instrumented on the basis of participation in the one or more functionalities.

15. The article of claim 12, wherein instrumenting the collection of class files comprises instrumenting a collection of class files that participate in addressing a concern of the application that requests services.

16. The article of claim 12, wherein performing data processing activities comprises performing workday data processing activities.

17. The article of claim 12, wherein the operations further comprise comparing actual results of playing back the method calls with expected results of playing back the method calls.

18. The article of claim 12, wherein weaving calls to external coding into the class files in the collection comprises: weaving calls to external coding into JAVA byte code of a corresponding class file during loading.

19. The article of claim 12, wherein weaving calls to external coding into the class files in the collection comprises: inserting calls using byte-code injection.

* * * * *